Patented Nov. 4, 1924.

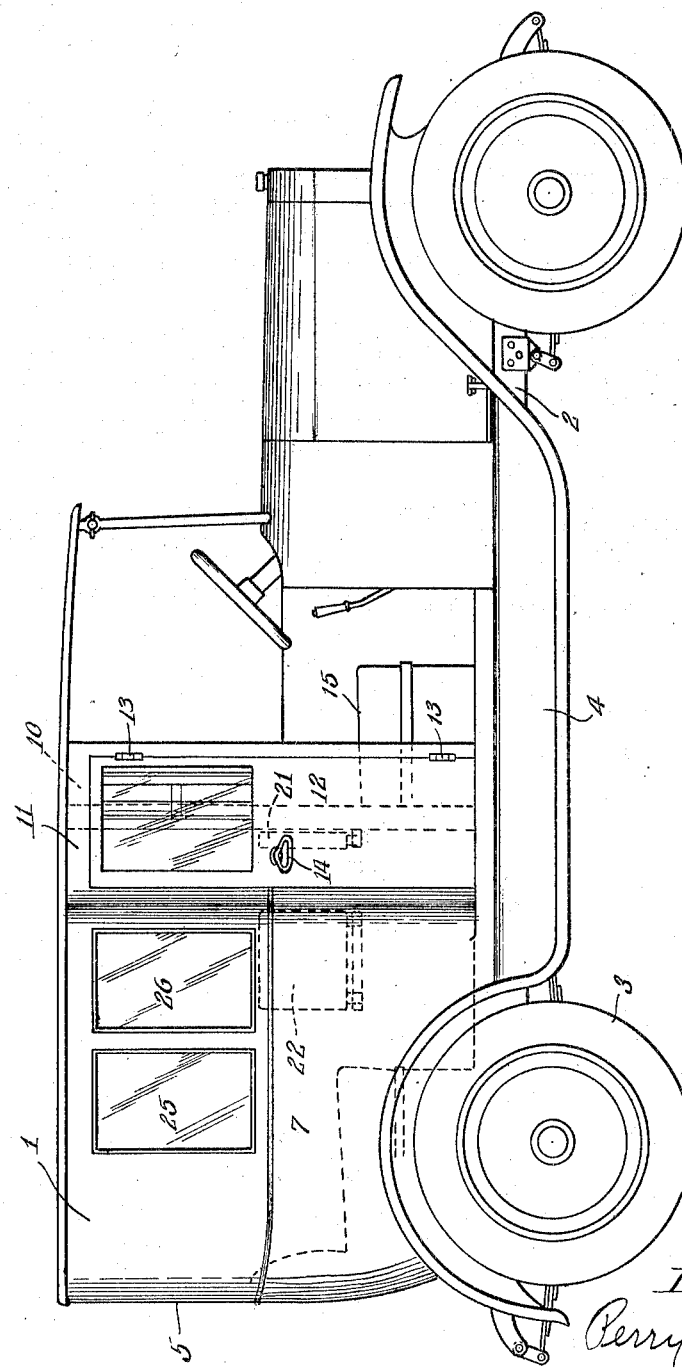

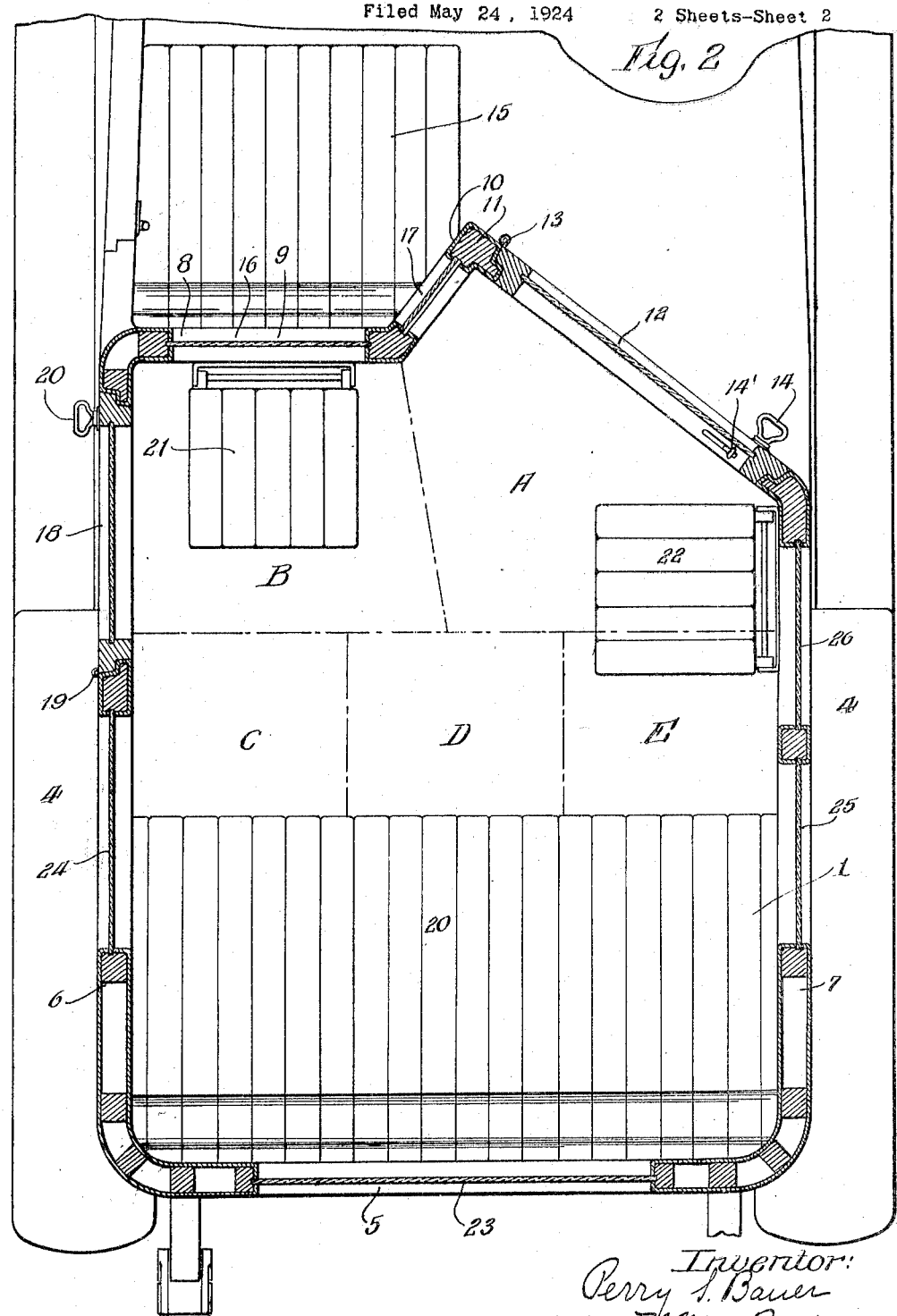

1,514,124

UNITED STATES PATENT OFFICE.

PERRY S. BAUER, OF CHICAGO, ILLINOIS.

VEHICLE BODY.

Application filed May 24, 1924. Serial No. 715,710.

*To all whom it may concern:*

Be it known that I, PERRY S. BAUER, a citizen of the United States, residing at Chicago, in the county of Cook and State of Illinois, have invented certain new and useful Improvements in Vehicle Bodies, of which the following is a specification.

This invention relates to a novel and improved vehicle body and forms a continuation in part of my co-pending application, Serial No. 660,481, filed September 1, 1923.

The increase in number of taxi-cabs makes it extremely desirable to provide a vehicle body which can be used with a taxi-cab and which will give as great seating capacity as possible.

Furthermore, it is a common complaint, particularly in large cities, that unscrupulous persons often engage a taxi-cab and when near their destination, at an opportune moment when the car is at a standstill, they will quietly open the door and slip out, leaving the door open. Not only does the driver lose his fare, but often the door being left swinging open is knocked off soon afterwards.

It is therefore an object of my invention to provide a vehicle body particularly adapted for use in a taxi-cab which will make it impossible for a passenger to leave the cab without the knowledge of the driver.

Another important object is to provide a vehicle body of substantially standard dimensions, but which will provide increased seating capacity.

A further object is to provide a door so placed that it may be readily opened by the driver, but which can not swing outwardly to a position where it will be in danger of being torn off.

Another object is to provide a vehicle body of such form that communication with the driver and payment of the fare may be performed without the driver leaving his seat and having to turn his head materially.

In the drawings wherein I have illustrated a preferred embodiment of my invention, Fig. 1 is a longitudinal elevation of my improved vehicle body as applied to a taxi-cab.

Fig. 2 is a horizontal sectional view of the vehicle body.

Referring now to the drawings, I have shown at 1 my vehicle body which is mounted on a chassis 2 of any desired suitable construction, provided with the usual wheels 3 and running boards 4.

Referring particularly to Fig. 2, my vehicle body comprises a rear wall 5, side walls 6 and 7, and a front wall 8. The front wall 8 has a portion 9 extending transversely of the body at substantially right angles to the side walls 6 and 7 and parallel to the rear wall 5, which is also substantially at right angles to the side walls. The front wall has immediately adjoining the portion 9 a forwardly extending offset portion 10, which forms, with the portion 9, a re-entrant angle. The forward end of this portion 10 is connected with the wall 7 by means of a rearwardly extending inclined portion 11 provided with a door 12.

The door 12 is hinged to the wall 11 at 13 and provided with a handle 14, from which it will be seen that it may be readily opened without projecting beyond the body a sufficient distance to be torn off, and without the driver having to leave his seat.

In the re-entrant angle formed by the portions 9 and 10 of the front wall 8 is placed the driver's seat 15. The portion 9 is provided with a window 16, and the portion 10 is provided with a window 17, which I prefer to make slidable so that it may be opened and provide means to communicate with the driver without having to turn his head a substantial amount, whereby he may also keep his eyes on the road ahead. In the wall 6 I provide an emergency door 18 hinged at 19 and with a handle 20 adjacent the front wall which may be operated only from the outside. The door 12 has the usual means 14' for opening from the inside as well as from the outside.

Extending across the rear of the body is a seat 20 adapted to seat three persons. On the portion 9 of the front wall 8, immediately in back of the driver's seat I place a folding seat 21 of well-known construction, and on the side wall 7 at the extreme forward portion thereof adjacent its connection with the rearwardly inclined portion 11. I provide another folding seat 22 of similar construction to seat 21. Each of these seats 21 and 22 is adapted to hold one person.

Suitable windows are provided as at 23, 24, 25 and 26.

From an inspection of Fig. 2 it will be seen that by providing the re-entrant angle between the portions 9 and 10 of the front wall I have made it possible to seat five persons in a cab in comfort. The additional space furnished by the forwardly extending walls 10 and 11 provides foot space for the passenger sitting on the seat 22, because he will naturally face the forwardly extending portion 10 of the front wall. It may therefore be said that the seat 22 faces said forwardly extending portion. I have shown in Fig. 2 the floor space divided into areas by dot and dash lines. The passenger on the seat 22 will occupy the space designated A; the one on seat 21 the space designated B; and the three persons on seat 21 will occupy the spaces C, D and E respectively. By this arrangement ample space is provided for the feet of all five and, furthermore, it is possible for any one of the five to leave the cab without inconveniencing the others, as a slight shifting of the feet on the part of one or two of the other occupants of the cab is all that is necessary. It is not necessary for any of them to rise or to get out of the cab.

From the foregoing description it will be evident that I have provided a vehicle body which occupies no more space than the ordinary taxi-cab, but which has an increased seating capacity, the seating arrangement also being such that passengers may enter and leave without annoying the other passengers in the cab. Furthermore, I have provided a construction which makes it impossible for a door to swing outwardly to a position where it may be torn off. This door is within reach and under control of the driver from his seat, from which he need not arise to open it. At the same time passengers may pay the driver or hold communication with him through the sliding window 17 without the driver having to turn his head.

I am aware that changes in the form, construction and arrangement of parts may be made without departing from the spirit and without sacrificing the advantages of the invention and I reserve the right to make all such changes as fairly fall within the scope of the following claims:—

I claim:—

1. A vehicle body comprising front, rear and side walls, said front wall having a portion extending transversely to said side walls and connected with one of said side walls, another portion extending forwardly from said first named portion, and a third rearwardly inclined portion connecting said forwardly extending portion with the other of said side walls, and a seat within said body facing said forwardly extending portion and located adjacent the point where said rearwardly inclined portion connects with said last named side wall.

2. A vehicle body comprising a front wall, a portion of said wall extending transversely of said body, another portion of said front wall extending forwardly of said first-named portion to form a re-entrant angle therewith, and a driver's seat in said re-entrant angle.

3. A vehicle body having a front wall and side walls, said front wall comprising a portion at substantially right angles to said side walls, a portion extending forwardly from said last named portion to form a re-entrant angle therewith, and another portion rearwardly inclined from the forward end of said forwardly extending portion and joining said portion with the other of said side walls.

4. A vehicle body having a front wall and side walls, said front wall comprising a portion at substantially right angles to said side walls, a portion extending forwardly from said last named portion to form a re-entrant angle therewith, another portion rearwardly inclined from the forward end of said forwardly extending portion and joining said portion with the other of said side walls, and a door in said rearwardly inclined portion.

5. A vehicle body having a front wall and side walls, said front wall comprising a portion at substantially right angles to said side walls, a portion extending forwardly from said last named portion to form re-entrant angle therewith, another portion rearwardly inclined from the forward end of said forwardly extending portion and joining said portion with the other of said side walls, and a door in said rearwardly inclined portion, said door being hinged to said forwardly extending portion.

6. A vehicle body comprising front, rear and side walls, said front wall having a portion extending at right angles to said side walls and connected with one of said side walls, another portion extending forwardly from said first-named portion, and a third rearwardly inclined portion connecting said forwardly extending portion with the other of said side walls, a seat on the inside of said front wall on said right angled portion, a seat on said last mentioned side wall adjoining its connection with said rearwardly extending portion of said front wall, and a seat extending across the rear of said body parallel to said rear wall.

7. In combination, a vehicle body comprising front and side walls, said front wall having a portion extending transversely to said side walls and connected with one of said side walls, another portion extending forwardly from said first named portion, a driver's seat arranged in the angle formed between said portions of said front wall, and said forwardly extending portion having an opening therein, whereby a driver in said seat may have communication with occupants of said body.

8. A vehicle body having a front wall and side walls, said front wall comprising a portion at substantially right angles to said side walls, a portion extending forwardly from said last-named portion to form a re-entrant angle therewith, another portion rearwardly inclined from the forward end of said forwardly extending portion and joining said portion with the other of said side walls, a door in said rearwardly inclined portion, said door being hinged to said forwardly extending portion, and a driver's seat in said re-entrant angle.

9. A vehicle body comprising a side wall, a door in said side wall, a front wall having a portion extending transversely of said side wall, means for fastening said door adjacent said transverse portion, said front wall having a portion extending forwardly of said transverse portion to form a re-entrant angle therewith, a door hinged to said forwardly extending portion, and a driver's seat within said re-entrant angle.

10. A vehicle body comprising a front wall, a portion of said wall extending transversely of said body, another portion of said front wall extending forwardly of said first named portion to form a re-entrant angle therewith, a third portion of said wall extending from the forward extremity of said forwardly extending portion, a door in said last-named portion hinged adjacent said forwardly extending portion and a driver's seat in said re-entrant angle.

PERRY S. BAUER.